United States Patent
Römmele et al.

(10) Patent No.: US 9,445,308 B2
(45) Date of Patent: Sep. 13, 2016

(54) METHOD FOR VERIFYING AND/OR PREPROCESSING DATA PACKETS AND CONTROL DEVICE SET UP TO CARRY OUT THE METHOD

(71) Applicant: CONTINENTAL AUTOMOTIVE GMBH, Hannover (DE)

(72) Inventors: Stefan Römmele, Kronberg/Taunus (DE); Ulrich Staehlin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/407,856

(22) PCT Filed: May 14, 2013

(86) PCT No.: PCT/EP2013/059928
§ 371 (c)(1),
(2) Date: Dec. 12, 2014

(87) PCT Pub. No.: WO2013/185997
PCT Pub. Date: Dec. 19, 2013

(65) Prior Publication Data
US 2015/0138975 A1    May 21, 2015

(30) Foreign Application Priority Data

Jun. 14, 2012 (DE) .......................... 10 2012 210 059

(51) Int. Cl.
*H04W 28/10* (2009.01)
*G08G 1/09* (2006.01)
(Continued)

(52) U.S. Cl.
CPC .............. *H04W 28/10* (2013.01); *G08G 1/093* (2013.01); *G08G 1/161* (2013.01); *G08G 1/164* (2013.01); *H04W 72/1242* (2013.01); *H04W 72/1247* (2013.01)

(58) Field of Classification Search
CPC ......... B60W 2550/402; B60W 10/06; B60W 50/14; G08G 1/161; G08G 1/167; G08G 1/142; G08G 1/163; G08G 9/02; G08G 1/16; G08G 1/166; G08G 1/20; G08G 1/096791; G08G 1/0969; H04J 3/1694; H04W 4/06; H04W 76/023; H04L 5/0091
See application file for complete search history.

(56) References Cited

U.S. PATENT DOCUMENTS 7,990,286 B2* 8/2011 Shankwitz ............. G01C 21/26
340/435
9,177,478 B2* 11/2015 Konet ..................... G08B 21/02
(Continued)

FOREIGN PATENT DOCUMENTS

DE          102 41 134 A1      3/2004
DE   10 2010 002092 A1     12/2010
(Continued)

OTHER PUBLICATIONS

Yan G. et al: "Providing VANET security through active position detection", Computer Communications, Elsevier Science Publishers BV, Amsterdam, NL, vol. 31, No. 12, Jul. 30, 2008.

*Primary Examiner* — Jung-Jen Liu
(74) *Attorney, Agent, or Firm* — Cozen O'Connor

(57) ABSTRACT

A method for verifying and/or preprocessing data packets received by a receiving device in a vehicle during wireless vehicle-to-environment communication includes: determining, in the receiving device, relevance of the received data packets; prioritizing, and verification and/or preprocessing according to their relevance, the data packets for the determination of the relevance depending on the distance between a transmitting device and the receiving device; and checking the signature of the transmitting device of the data packets and/or preprocessing the data packets in an order predefined by the prioritizing. The determination of the relevance also depends on the type of data packet and/or the type or position of the transmitting device, taking into account the position of the transmitting device based on another safety-relevant object.

7 Claims, 2 Drawing Sheets

(51) Int. Cl.
*G08G 1/16* (2006.01)
*H04W 72/12* (2009.01)

(56) References Cited

U.S. PATENT DOCUMENTS

| | | |
|---|---|---|
| 2006/0229812 A1 | 10/2006 | Eckstein et al. |
| 2007/0109146 A1 | 5/2007 | Tengler et al. |
| 2007/0117525 A1* | 5/2007 | Osafune .................. G08G 1/20 455/99 |
| 2009/0133121 A1 | 5/2009 | Falk et al. |
| 2011/0080302 A1 | 4/2011 | Muthaiah et al. |
| 2013/0278440 A1* | 10/2013 | Rubin ...................... G08G 9/02 340/903 |

FOREIGN PATENT DOCUMENTS

| | | |
|---|---|---|
| DE | 10 2011 107 111 | 1/2013 |
| EP | 2 058 992 A1 | 5/2009 |
| WO | WO 03/077223 A1 | 9/2003 |

* cited by examiner

METHOD FOR VERIFYING AND/OR PREPROCESSING DATA PACKETS AND CONTROL DEVICE SET UP TO CARRY OUT THE METHOD

CROSS-REFERENCE TO RELATED APPLICATIONS

This is a U.S. national stage of application No. PCT/EP2013/059928, filed on 14 May 2013, which claims priority to the German Application No. DE 10 2012 210 059.8 filed 14 Jun. 2012, the content of both incorporated herein by reference.

BACKGROUND OF THE INVENTION

1. Field of the Invention

The invention relates to a method for verifying and/or preprocessing data packets which are preferably signed and are received by a receiving device in a vehicle during wireless vehicle-to-environment communication, and to a control device set up to carry out the method.

In the method, the relevance of the received data packets is determined in the receiving device, that is to say the receiver or a downstream computing unit, and the data packets are prioritized for verification and/or preprocessing according to their relevance, the determination of the relevance depending on the distance between the transmitting device and the receiving device, the receiving device being arranged in the vehicle and the distance between the transmitting device and the driver's own vehicle therefore being determined according to the invention. The method provides for the signature of the transmitting devices to be checked when verifying the data packets and/or for the data packets to be preprocessed in an order predefined by the prioritization.

2. Related Art

Vehicle-to-environment communication is currently being developed, in which case various standards (for example ETSI or CEN for Europe or IEEE or SAE for USA) are being developed. Vehicle-to-environment communication (also called V2X communication for short) is usually based on a WLAN transmission technology according to the IEEE 802.11p standard, in which case a GSM/UMTS/LTE or another mobile radio link is also fundamentally possible for communication. Vehicles and infrastructure units (road side units (RSU)) equipped with transmission devices for vehicle-to-environment communication are currently tested on this basis.

A central problem of vehicle-to-environment communication is the authenticity of the data packets transmitted during vehicle-to-environment communication, since the data packets partially contain security-relevant or personal information and therefore a certain degree of protection of these data must be ensured both with regard to the certainty of the transmitter and with regard to the processing by the receiver. In order to meet this security requirement, it is planned to sign and possibly also encrypt each data packet using cryptographic methods. A system which is based on a public key infrastructure (PKI) and has so-called elliptic curves algorithms (ECC) can be used for this purpose. Such methods are generally known and are not the subject matter of the present invention, with the result that such methods do not have to be described in more detail as part of this application.

The received data packets or messages can then be verified by the receiving vehicle before processing and evaluation take place in the individual control devices of the vehicle. In this case, verification comprises, in particular, the checking of the signature of the transmitting device in the receiving device.

This verification is very intensive in terms of computation time and can only be carried out using hardware accelerator chips in conventional control devices according to the current prior art in order to be able to verify an excessively large number of messages and to manage the large number of data packets potentially interchanged during vehicle-to-environment communication.

As part of the currently contemplated standards, provision is made for all emitted data packets to have to be compulsorily signed. However, it is left to the receiver how it deals with the received data packets and whether and in what order the signature of the data packets is checked. Situations are conceivable in which the computing capacity of the computing unit implemented in the receiving device is not sufficient to verify all received data packets and therefore there is a need for a targeted selection of messages or data packets which in all probability have the greatest relevance to the driver's own vehicle.

In this environment, the practice of sorting the received data into at least two relevance classes and, depending on the relevance class, processing the data further in the communication stack and supplying them to authentication or rejecting data packets, for example, or using them only for non-safety-relevant purposes has already been described. In this case, the distance between the object and the vehicle can be selected as the criterion for classification into the relevance classes. Additionally or alternatively, the practice of using a possible collision time based on the distance and the relative speed between the object emitting the data packet and the driver's own vehicle, instead of the distance, has also been described.

In a similar context, US 2007/0109146 A1 discloses the practice of providing an adaptable relevance area in the case of a bidirectional wireless communication link between vehicles, which relevance area is periodically adapted regularly or continuously in accordance with the continuously monitored road condition, visibility conditions and/or vehicle operating conditions. A similar disclosure is also found in WO 03/077223 A1.

However, it has been shown that these measures alone are not suitable for reliably reducing the relevance of received data packets to the extent that relevant data packets can be reliably preselected or prioritized with respect to the available computing capacity in the receiving device (control device).

SUMMARY OF THE INVENTION

Therefore, an object of the present invention is to speed up the computation-intensive verification and/or preprocessing of data packets and to keep the costs of the computing capacity required therefor as low as possible.

This object is achieved according to the invention by a method in which provision is made for the determination of the relevance for prioritizing the data packets to also, possibly also additionally, depend on the type of data packet and/or the type or position of the transmitting device. As a result, further and/or more precise criteria are used for the relevance classification, with the result that the prioritization of the data packets is more effective and more reliable. Since the data packets are verified and/or preprocessed in the order of their prioritization, the receiving devices can also process the most important data packets promptly with a lower computing power, with the result that an increased computing capacity is not needed to process a multiplicity of data packets since the data packets are processed in succession according to their prioritization, in which case the prioritization of data packets can either be reduced and/or data packets can be deleted from the processing list according to the invention after a particular time because it can be assumed that these packets are then no longer important.

It is particularly useful to check the type of data packet before verification and/or preprocessing. The standards discussed provide for the emission of different types of data packets which are different in terms of their relevance. For example, decentralized environmental notification messages (DENM) are provided and generally comprise urgent warnings and therefore are particularly relevant with regard to safety. These messages will be given a particularly high prioritization according to the invention. Cooperative awareness messages (CAM) are also provided and may usually comprise the status of different participants in vehicle-to-environment communication, for example vehicle type and directional speed of another vehicle, type and state of a road side unit (such as a traffic light) or the like. These messages and other messages, which have not been specified in any more detail generally, have a lower safety relevance and are therefore assessed to be inferior, in which case the CAM messages (data packets) are preferably handled even before the general data packets whose type has not been specified in any more detail.

A corresponding situation applies to the type of transmitting device, which may be another vehicle, a warning road side unit or a simple information road side unit, with the result that different relevance is assigned to these transmitting devices per se, vehicles and warning road side units having greater relevance than other transmitting devices.

It is also particularly advantageous to take into account the position of the transmitting device when determining the relevance, the position of the transmitting device based on a static and/or dynamically changing, other safety-relevant object being taken into account, that is to say an object that is different from the vehicle receiving the data packet. This is because it has been shown that the distance or the reference to the driver's own vehicle alone is generally not a suitable criterion for stipulating a reliable prioritization. In particular, it is useful to select another, third safety-relevant object as a further criterion, those objects which can be derived or identified from vehicle-to-environment communication being able to be selected as particularly safety-relevant objects. Such further safety-relevant objects may be the type of transmitting device, for example an infrastructure unit, or the position of the transmitting device based on another static object. This other object may simply be a stationary object, that is to say a fixed space that is known to be safety-critical with respect to traffic safety and/or data security. Such locations may be accident black spots or else locations at which erroneous or falsified data packets are often emitted.

One particularly preferred further development of the proposed method also provides for the position of the transmitting device based on a dynamic object to be taken into account when determining the relevance. According to an aspect of the invention, a dynamic object is a safety-relevant situation that is identified in the receiving device, is allocated to a location and occurs temporarily. This makes it possible to take into account particularly current situations. Such a dynamic object may be, for example, a DENM notification or an important or dangerous traffic situation, for example a detected end of a traffic jam, and therefore typically an object that can be identified or derived from vehicle-to-environment communication. This has the advantage that both a time and a location are allocated to the warning messages, with the result that the dynamic object is clearly predefined as part of vehicle-to-environment communication.

According to the invention, a dynamic object can also be an important or dangerous traffic situation that has been detected and located by environmental sensors in a vehicle such as radar, lidar, cameras or the like.

Concomitantly using the position of the transmitter relative to such a dynamic object to assess relevance makes it possible to prioritize messages from locations that are particularly relevant to the safety of the vehicle in such a manner that they are processed first during verification and/or preprocessing, with the result that the information from the environment of a particularly critical situation (in the sense of a dynamic object) is evaluated quickly and is available in the vehicle for the purpose of warning the driver and/or for driver assistance systems.

One preferred variant of the proposed method provides for safety-critical objects in the area surrounding the vehicle to first of all be determined when taking into account the position of the transmitting device and for a distance range to each safety-critical object to be determined. The safety-critical objects are then put into a relevance order, in particular according to their distance from the receiving device or the driver's own vehicle and/or according to other criteria. According to an aspect of the invention, data packets from the distance range of the safety-critical objects are then processed and/or verified in the order predefined by the relevance order of the safety-critical objects. In this case too, the determination of the relevance depends at least indirectly on the distance between the transmitting device and the receiving device since the safety-critical objects in the area surrounding the vehicle are determined, which area is defined, in particular, on the basis of the distance of the vehicle, for example by checking whether the transmitters are in a particular geographical area around the vehicle, and the transmitters are also in a particular distance range around the safety-critical object. In addition, the direct distance may also naturally be included in the determination of the relevance, for example by checking whether the transmitting device is in a particular geographical area around the vehicle. A greater relevance can then be allocated to transmitting devices in this area around the vehicle than transmitting devices outside this area.

Accordingly, a further embodiment may provide, according to an aspect of the invention, for a predefined geometry to be produced around the (driver's own) vehicle for the dependence of the relevance on the distance between the transmitting device and the receiving device and/or for determining the safety-critical objects in the area surrounding the (driver's own) vehicle. As a result, the distance to the driver's own vehicle is also concomitantly taken into account in the relevance check, in which case not only the distance value but rather a distance value weighted according to direction can be taken into account most easily in this manner, for example in order to take into account different driving situations of the vehicle.

According to one preferred embodiment, the predefined geometry may have a round, elliptical, rectangular or trapezoidal basic shape, which preferably surrounds the driver's own vehicle and is preferably oriented in a fixed manner with respect to the vehicle in a parameterizable manner with the direction of travel of the vehicle. It is also preferably possible to adapt the length and width of the basic shape by specifying parameters and/or preferably to adapt the shape of individual sides of the basic shape, for example by specifying parameters, for example by virtue of individual sides being rounded, as a result of which the geometry taken into account overall around the (driver's own) vehicle changes. This makes it possible to take into account different driving situations by selecting suitable geometries and/or parameters for determining the geometries.

Additionally or alternatively, it can be specified that the predefined geometry, in a similar manner to the form of light distribution of a headlight, is also adapted, in terms of its extent, orientation and shape, on the basis of the driving situation and/or driver inputs, for example in a similar manner to headlamp beam adjustment, cornering light or the like. This option is particularly useful when a situation in front of the vehicle in the direction of travel needs to be detected, for example when traveling at high speed.

Furthermore, the invention may provide for the driving situation of the vehicle to be concomitantly taken into account for the dependence of the relevance on the distance between the transmitting device and the receiving device and/or for determining the safety-critical objects in the area surrounding the vehicle, in particular in a manner defined by the speed of the vehicle. The number and/or amplitude of steering movements of the driver's own vehicle can also be used as further and/or alternative criteria. Furthermore, environment detection from a positioning system in conjunction with map information and/or environmental sensors, in particular cameras, are possible as criteria, if appropriate. This makes it possible to determine, for example, whether the user is on freeways, country roads or city streets. This dependence may also involve, in particular, the fact that the above-mentioned selected or predefined geometry depends on the driving situation of the vehicle. This also makes it possible to prioritize the data packets in a targeted manner based on the respective situation of the vehicle.

Furthermore, a speed of the transmitting device can be taken into account according to the invention for the dependence of the relevance on the distance between the transmitting device and the receiving device and/or for determining the safety-critical objects in the area surrounding the vehicle, which speed can be derived, in particular as a directional speed, from information from vehicle-to-environment communication.

One further development of the method can also provide for the type of safety-relevant object, the number of safety-relevant objects in the reception environment, the number of data packets currently received by the receiving device per unit time and/or the computing power of the receiving device, in particular the computing power for verifying and/or preprocessing data packets, to be taken into account for determining the safety-critical objects in the area surrounding the vehicle. These factors help to match the relevance choice to the respective receiving device.

The determination of the safety-critical objects in the area surrounding the vehicle, as repeatedly mentioned above, also includes, according to the invention, the definition of the distance range to a safety-relevant object.

Another aspect of the invention relates to a control device of a motor vehicle for verifying and/or preprocessing preferably signed data packets, having a receiving device for wireless vehicle-to-environment communication and having a computing unit, the computing unit being configured to carry out the above-described method or parts thereof.

BRIEF DESCRIPTION OF THE DRAWINGS

Further advantages, features and possible uses of the invention also emerge from the following description of an exemplary embodiment and the drawings. In this case, all features described and/or shown in the figures form the subject matter of the present invention on their own or in any desired combination, including independently of their synopsis in the claims or their back-references. In the drawings:

DETAILED DESCRIPTION OF THE PRESENTLY PREFERRED EMBODIMENTS

Data packets are received by a receiving device (not illustrated here) in a vehicle during wireless vehicle-to-environment communication, the receiving device usually also containing a computing unit for verifying and/or preprocessing the received data packets and being integrated in a motor vehicle control device.

The verification and/or preprocessing of data packets is/are a computation-intensive operation in the receiving device which cannot be readily conducted in conventional receiving devices without corresponding outlay in terms of hardware and costs.

Figure 1:
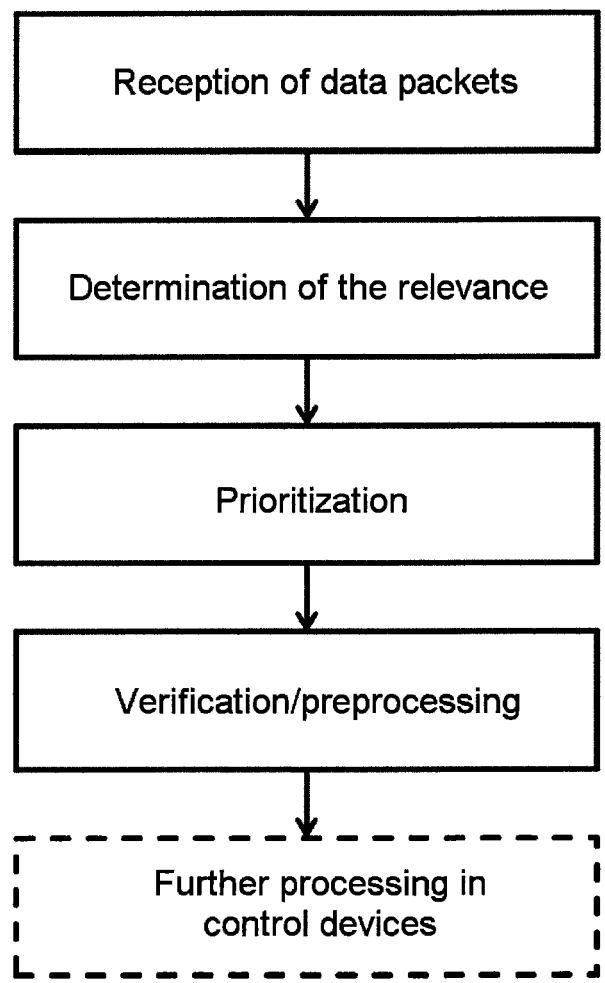
FIG. 1 schematically shows, in a flowchart, the sequence of one embodiment of the method according to the invention for verifying and/or preprocessing data packets.

As schematically illustrated in FIG. 1, an embodiment of the invention therefore proposes initially determining the relevance of the received data packets after the data packet has been received and then prioritizing the data packets for verification and/or preprocessing according to their identified relevance. This means that the relevance of the data packet is automatically estimated on the basis of predefined criteria in the computing unit of the receiving device, which may be a control unit containing the actual receiver or a computing unit in a control device separate from the receiver. This is carried out for all incoming data packets.

A rank order of importance of the data packets, which is also referred to as prioritization, can therefore be determined from the determined or estimated relevance of the data packets. The data packets are therefore sorted, by the prioritization, into an order in which the further processing is then carried out in control devices of the motor vehicle. The further processing is no longer the subject matter of the present method.

Therefore, the box representing the further processing is illustrated using dashed lines in FIG. 1.

Figure 2:
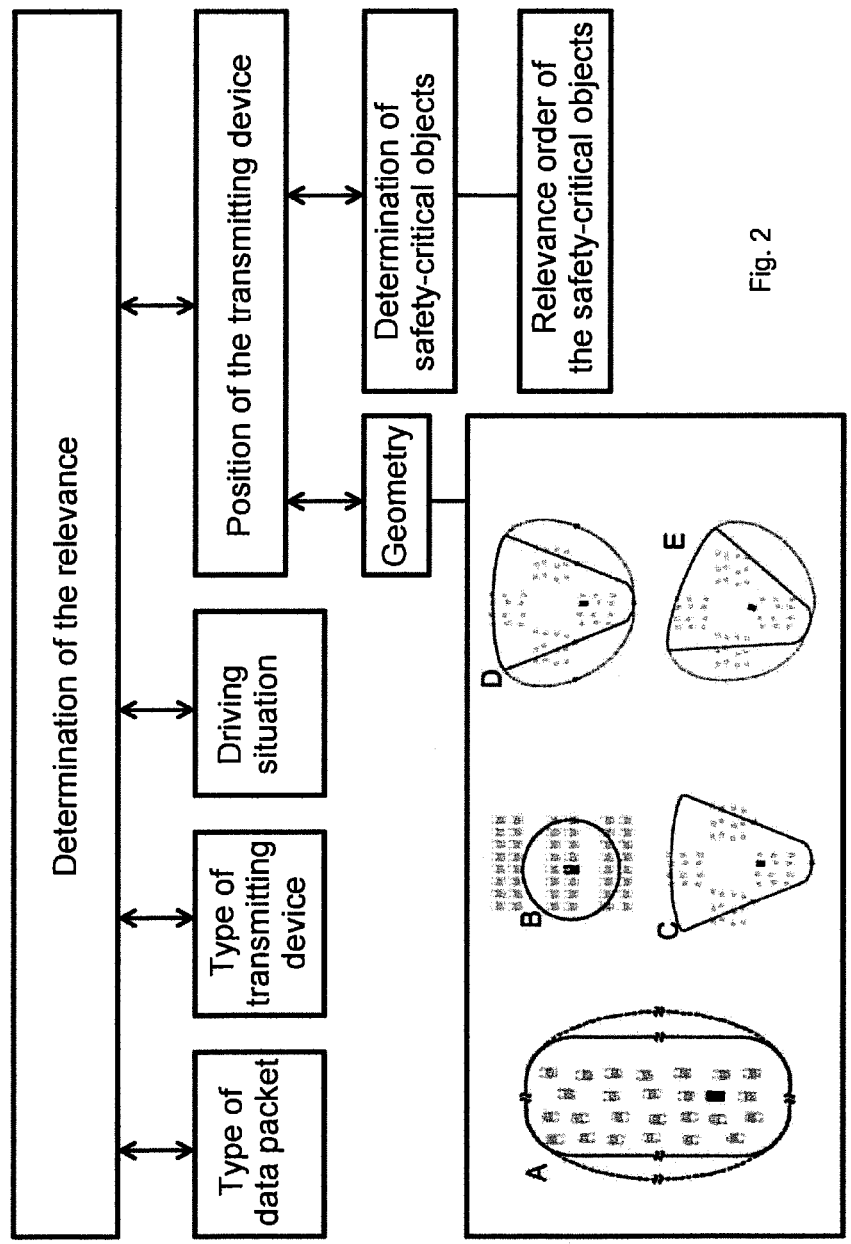
FIG. 2 schematically shows an overview of variants and/or possibilities for determining the relevance of a data packet which are preferably proposed according to the invention.

The determination of the relevance that follows the reception of data packets is examined again in more detail below in different variants and possibilities with reference to FIG. 2.

The possibilities for determining the relevance which are illustrated here are each particularly preferred applications which can be used to determine the relevance of a data packet and can possibly also be combined with one another in order to identify the relevance of data packets with particularly great reliability.

During vehicle-to-vehicle communication, the proposed standards provide for the type of data packets to be concomitantly specified in the data packet during transmission and to be able to be easily recognized separately from complete evaluation of the contents of the data packet. For example, provision is made for hazardous situations on the road to be transmitted in so-called decentralized environmental notification messages (DENM). General notifications relating to the state of other communication partners in vehicle-to-environment communication are sent in so-called cooperative awareness messages (CAM). However, these generally do not contain any directly safety-relevant information. However, a hazardous situation, for example a vehicle on a collision course, can be identified using CAMs.

Therefore, one possibility for determining the relevance and for prioritizing a data packet is to evaluate the type of received data packet and to handle the so-called DENM notifications with a high priority since the type of DENM notifications generally comprises urgent warnings. Therefore, it is useful to give the DENM notifications priority over the CAM notifications and all other possible data packets which are interchanged during vehicle-to-environment communication.

Another possibility for determining the relevance of a data packet may also involve taking into account the type of transmitting device. For example, there are transmitting devices which, as so-called road side units, warn that the receiving vehicle is now approaching a particularly precarious road area. Road side units are therefore communication participants that are not arranged in other vehicles but rather in separate transmitting devices on the road side, for example in traffic lights, warning signs or the like, which, possibly at accident black spots or other dangerous locations, draw attention to this dangerous location by emitting data packets. Transmitting devices arranged in warning signs may also be handled with priority.

In this case, but also in combination with other possibilities for determining the relevance of a data packet, the driving situation of the driver's own vehicle can also be taken into account, in particular. Those data packets likely to have greater relevance to the receiving (driver's own) vehicle than others can be selected on the basis of the driving situation. In this case, the relevance can be determined, for example, using fundamental conditions, for example:

a. Traveling on routes with high speeds and small steering movements (federal highways, country roads and freeways);
b. Traveling on routes with average speeds and large steering movements (state highways, federal highways and country roads as well as freeways with turning-off maneuvers or exits);
c. Traveling on routes with low speeds and large steering movements (state highways and parking lots).

Taking into account these different driving situation classes, the relevance of individual data packets can then preferably be determined relative to the driver's own vehicle according to the position of the emitting vehicle or more generally the emitting transmitting device, that is to say on the basis of the distance between the driver's own vehicle and the transmitting device.

According to another important feature for determining the relevance, the position of the transmitting device in absolute terms and/or relative to the driver's own vehicle is therefore also taken into account. In order to select the data packets of higher relevance, it is possible to select the transmitting stations according to geometrical aspects, in which case different possibilities for geometries which are each intended to represent the visibility of vehicles are described below.

The vehicle shown dark in each of the different geometries A, B, C, D and E represents the driver's own vehicle or the reference vehicle (receiving vehicle) which, for example on the basis of the driving situation just described, selects one of the geometries A to E, according to which the received data packets are classified in terms of relevance and are then prioritized. The data packets are then verified and/or preprocessed according to this order. However, the geometries A to E shown should not be understood as meaning an exclusive or restrictive list since further geometries may also be conceivable and useful depending on the driving situation.

The geometry A is characterized in that it has a width of several lanes and an extent of many vehicle lengths to the front and some vehicle lengths to the rear. The points shown brighter around the dark driver's own vehicle are intended to characterize other vehicles on a road, for example a two-lane freeway with an oncoming carriageway on which the driver's own vehicle is moving at high speed. The geometry can preferably extend further forward or not as far forward depending on the speed of the vehicle. The width of the geometry A can be adapted such that at least all lanes of the road and possibly hard shoulders are concomitantly covered.

The geometry B shows a substantially circular or elliptical relevance area in which the driver's own vehicle is in a parking space in a parking lot, for example. The extent of this relevance area is comparatively small since the driver's own vehicle is moving only at low speed. Since the direction of travel is also frequently changed between forward driving and reversing in this case, the driver's own vehicle with the receiving device is arranged approximately in the center of the geometry and covers an area of approximately the same size to the front and rear and on both sides.

The geometry C is characterized in that it has a trapezoidal shape with rounded front and rear sides, comparable to a light cone which strikes a road, for instance. The rear width of the trapezoidal shape comprises the width of several lanes in order to possibly acquire warning notifications from vehicles behind the vehicle on the road. The front width of the trapezoidal shape is greater than the rear width of the trapezoidal shape in order to also concomitantly detect the crossing traffic at intersections, for example.

The geometry D is based on the geometry C and also has rounded sides in addition to the rounded front and rear sides. In this case too, the rear width of the trapezoidal shape comprises the width of several lanes. The front width of the trapezoidal shape is greater than the rear width of the trapezoidal shape in order to have a field of view which is widened overall to the front. It may be applied to country roads, for example. However, on account of the rounded sides, the geometry comprises a relatively large lateral visibility for cross-traffic, with the result that this geometry is particularly suitable for city traffic.

In addition to the geometry C, the geometry E also takes into account the steering angle of the driver's own vehicle, which wishes to turn right in the example illustrated. Therefore, the vehicles in the right-hand intersection road are given greater relevance. This is taken into account by virtue of the trapezoidal shape bending to the right with the steering angle, with the result that more vehicles are detected in this area.

Depending on the respective driving situation a, b or c, one of the above-mentioned geometries is used to select the data packets with the greatest relevance.

If, for example, all received messages have been verified in accordance with the spatial position of the transmitting device according to the selected geometry, the geometry can be extended to a further geometry. The delimiting area in each case can therefore also be extended in a second or third prioritization. This processing of different geometries is carried out until the maximum number of messages enabled by the hardware have been verified. An exemplary procedure for this is as follows:

In the driving situation a, that is to say traveling with high speeds and small steering movements, the geometry A is first of all selected, then the geometry B or C and then an extension of the geometry A in the direction of travel to the front and/or rear in order to detect the relevance of different data packets. The geometry A detects many data packets which are in the typical view of the driver's own vehicle. The geometry B then detects those data packets which are particularly close to the driver's own vehicle and therefore have the greatest relevance. If data packets that have not been processed are still then available, the relevance area of the geometry A is extended to the front and/or rear, in particular, in order to also be able to process these data packets.

In the above-described driving situation c with low speeds and large steering movements, the geometry B which covers the immediate vicinity of the vehicle when stationary or at very low speeds is first of all selected. As soon as the vehicle moves slightly, the geometry B is then changed to the geometry D or E, in which case the geometry D or E can be increased to the front and rear depending on the direction of travel or steering direction in order to detect data packets which have possibly not yet been classified as relevant by then and to concomitantly process them.

A further aspect which can possibly also be combined with the geometries described above when determining the relevance involves determining safety-critical objects around the driver's own vehicle in one of the geometries A to E, for example, rather than determining the position of the transmitting device relative to the driver's own vehicle, and then evaluating the position of the transmitting device with respect to this safety-critical object. In this case, the procedure may fundamentally be that the safety-critical objects in the area surrounding the vehicle are first of all determined and the relevance order of the safety-critical objects around the vehicle is then stipulated in order to determine the relevance of the received notifications on the basis thereof. Important, safety-relevant objects may be an important situation, for example an end of a traffic jam, a DENM notification, an infrastructure unit or a location which is known to be critical to safety and is known in fixed coordinates, for example.

As soon as such a location appears in the area surrounding the vehicle, for example inside one of the geometries A to E, the safety-critical object is determined as such. For the incoming data packets, a check is then carried out in order to determine how close the transmitting device is to the location of a safety-critical object, for example by specifying a distance. This distance can also depend on the speed of the driver's own vehicle, the speed of the transmitting device, the type of safety-critical object, the number of safety-critical objects in the reception environment of the vehicle, the number of messages currently received per unit time and/or the verification power of the receiving device or the computing unit used for this purpose.

For this purpose, the safety-critical objects in the area surrounding the vehicle can first of all be specifically determined. It is then stipulated, for example by specifying a perimeter around each safety-critical object, which transmitting devices are still assigned to this safety-critical object. The safety-critical objects are then prioritized and the messages from the defined parameter are verified and preprocessed in the relevance order of the first safety-critical object. The messages or data packets from the defined perimeter around the subsequent safety-critical objects in the relevance order then follow. If not all data packets are detected in this method, others of the above-mentioned methods can then be used to also stipulate their relevance order.

The procedure described above therefore makes it possible to efficiently preselect relevant data packets in the sense of preprocessing and/or verification, in which case the aim is to process the important data packets first and therefore to shorten the latency for reactions.

Selecting data packets to be verified according to clear rules makes it possible for the hardware support for the computing unit carrying out the verification and/or preprocessing to be less complicated and therefore makes it possible to save costs since not all data packets have to be checked and the most important data packets are checked first.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for verifying and/or preprocessing data packets received by a receiving device in a vehicle during wireless vehicle-to-environment communication, the method comprising:

determining, in the receiving device, relevance of the received data packets;

prioritizing, and verification and/or preprocessing according to their relevance, the data packets for the determination of the relevance depending on the distance between a transmitting device and the receiving device; and checking the signature of the transmitting device of the data packets and/or preprocessing the data packets in an order predefined by the prioritizing, wherein the determination of the relevance also depends on the type of data packet and/or the type or position of the transmitting device, taking into account the position of the transmitting device based on another safety-relevant object, the method further comprising, in the following order:

determining safety-critical objects in an area surrounding the vehicle when taking into account the position of the transmitting device;

determining a distance range to each safety-critical object;

putting the safety-critical objects into a relevance order; and preprocessing and/or verifying data packets from the distance range of the safety-critical objects in the order predefined by the relevance order of the safety-critical objects, wherein a predefined geometry is produced around the vehicle for the dependence of the relevance on the distance between the transmitting device and the receiving device and/or for determining the safety-critical objects in the area surrounding the vehicle, wherein the predefined geometry has a round, elliptical, rectangular or trapezoidal basic shape which preferably surrounds the vehicle and is preferably oriented in a fixed manner with respect to the vehicle in a parameterizable manner with the direction of travel of the vehicle, and wherein the receiving device in the vehicle is configured to select one from among the round, elliptical, rectangular and trapezoidal basic shapes based on a driving situation of the vehicle.

2. The method as claimed in claim 1, wherein the position of the transmitting device based on a dynamic object is taken into account when determining the relevance.

3. The method as claimed in claim 1, wherein the predefined geometry, in a similar manner to the form of light distribution of a headlight, is adapted, in terms of its extent, orientation and shape, on the basis of a driving situation of the vehicle and/or driver inputs.

4. The method as claimed in claim 3, wherein the driving situation of the vehicle is taken into account for the dependence of the relevance on the distance between the transmitting device and the receiving device and/or for determining the safety-critical objects in the area surrounding the vehicle.

5. The method as claimed in claim 1, wherein a speed of the transmitting device is taken into account for the dependence of the relevance on the distance between the transmitting device and the receiving device and/or for determining the safety-critical objects in the area surrounding the vehicle.

6. The method as claimed in claim 1, wherein a type of safety-relevant object, the number of safety-relevant objects in a reception environment, the number of data packets currently received by the receiving device per unit time and/or the computing power is/are taken into account for determining the safety-critical objects in the area surrounding the vehicle.

7. A control device of a motor vehicle for verifying and/or preprocessing data packets, having a receiving device for wireless vehicle-to-environment communication and having a computing unit, wherein the computing unit is configured to carry out the method as claimed in claim 1.

* * * * *